UNITED STATES PATENT OFFICE.

CHARLES GLASER, OF BALTIMORE, MARYLAND, ASSIGNOR OF ONE-HALF TO CHARLES F. W. DAMBMANN, OF SAME PLACE.

PROCESS OF MAKING ACID PHOSPHATE.

SPECIFICATION forming part of Letters Patent No. 389,566, dated September 18, 1888.

Application filed December 13, 1887. Serial No. 257,794. (No specimens.)

*To all whom it may concern:*

Be it known that I, CHARLES GLASER, of Baltimore, in the State of Maryland, have invented a new and useful Method of Converting Insoluble Phosphoric Acid in Petrified or Mineral Phosphates by Direct Application of Phosphoric Acid, of which the following is a specification.

Hitherto it has not been practicable to convert the phosphates of lime existing in mineral phosphates—such, for example, as South Carolina rock—into available phosphoric acid by direct application of phosphoric acid to such phosphates; but by the method herein described such mineral phosphates may be treated and converted into a compound containing from twenty-five to forty per cent. of available phosphoric acid, at the same time avoiding the formation of any considerable quantity of sulphate of lime or other similar compound.

To enable others skilled in the art to practice my process, the following is the method which I adopt: I take the hard rock or mineral phosphate and divide it finely by grinding or otherwise. It should be well ground. Experiment has shown that such mineral ground to pass through a mesh of from fifty to one hundred to the inch will answer practically the purpose. When ground, I add directly phosphoric acid containing forty per cent. in volume of phosphoric anhydrid and the product is a mineral phosphate containing a high amount of available phosphoric acid. This process may be followed without the application of artificial heat.

A good way is to take the mineral and after grinding divide into two parts, and then extract the phosphoric acid from one portion by any of the known methods for use in treating the other. When extracted, concentrate to about 50° Baumé and apply to the other portion.

I am aware that with animal-bone and other phosphates of animal origin it has been practicable to convert the bone phosphate of lime contained in such phosphates into available phosphoric acid by direct application of phosphoric acid; but so far as I know all efforts in this direction with the harder and denser mineral and petrified phosphates have failed.

The proportion of the phosphoric acid to the ground mineral phosphate will vary, according to the character of the phosphate used, from one hundred of mineral phosphate to fifty of phosphoric acid in those minerals most easily converted up to one hundred and thirty of phosporic acid in those which are hardest to treat.

I obtain by this process a mineral phosphate rich in available phosphoric acid, which may be readily used for fertilizers or any purpose to which it is applicable.

What I claim is—

The above-described method of converting the insoluble phosphoric acid contained in mineral and petrified phosphates into available phosphoric acid by first finely dividing the mineral and then applying directly phosphoric acid, substantially as described.

CHARLES GLASER.

In presence of—
 MAGGIE TURNER,
 FELIX R. SULLIVAN.